United States Patent

[11] 3,613,858

[72] Inventor Victor Ian Malcolm Cox
 Woodford Wells, England
[21] Appl. No. 794,220
[22] Filed Jan. 27, 1969
[45] Patented Oct. 19, 1971
[73] Assignee Albro Fillers and Engineering Company Limited
 Ponders End, Middlesex, England
[32] Priority Feb. 1, 1968
[33] Great Britain
[31] 5278/68

[54] SYSTEM OF DRIVING A PLURALITY OF MACHINES
 7 Claims, 8 Drawing Figs.
[52] U.S. Cl. ..................... 198/19, 214/16 B
[51] Int. Cl. ..................... B65g 37/00
[50] Field of Search ..................... 198/19

[56] References Cited
UNITED STATES PATENTS
2,167,676 8/1939 Pechy ..................... 198/102

Primary Examiner—Gerald M. Forlenza
Assistant Examiner—Frank E. Werner
Attorney—Cushman, Darby & Cushman ABSTRACT: A system of synchronizing the drive of a plurality of machines comprising means for sensing when the machines are running out of synchronism and valve means operative in response thereto for controlling the flow of hydraulic medium to which the drive of at least one of the machines responds to restore synchronism, more particularly applied to the flow treatment of articles, such as containers, through successive machines.

One machine, however driven may be treated as the master machine and the other or others, hydraulically driven as a slave machine or slave machines. The sensing means, which may be fluid operated, electrical or mechanical, may respond to relative motion between rotary monitoring components driven by the respective machines or to the articles themselves.

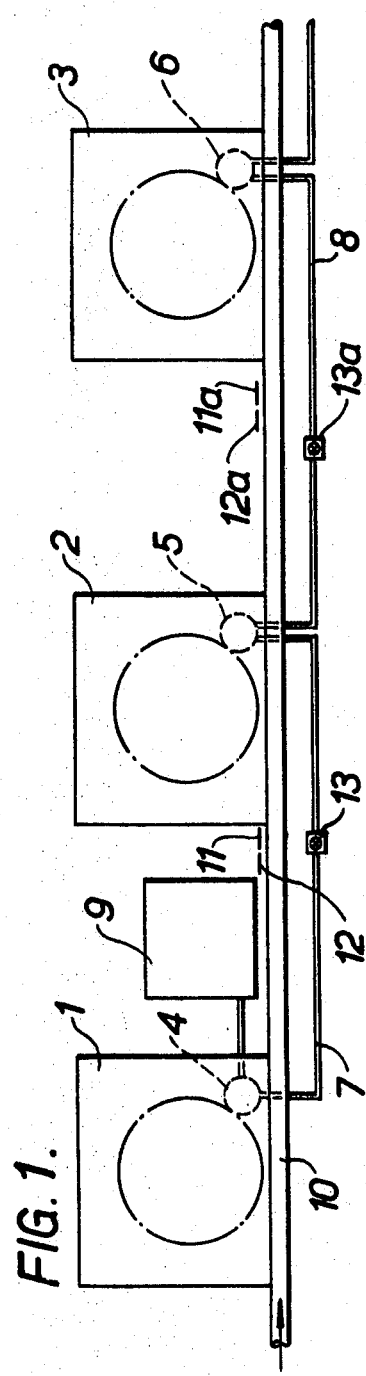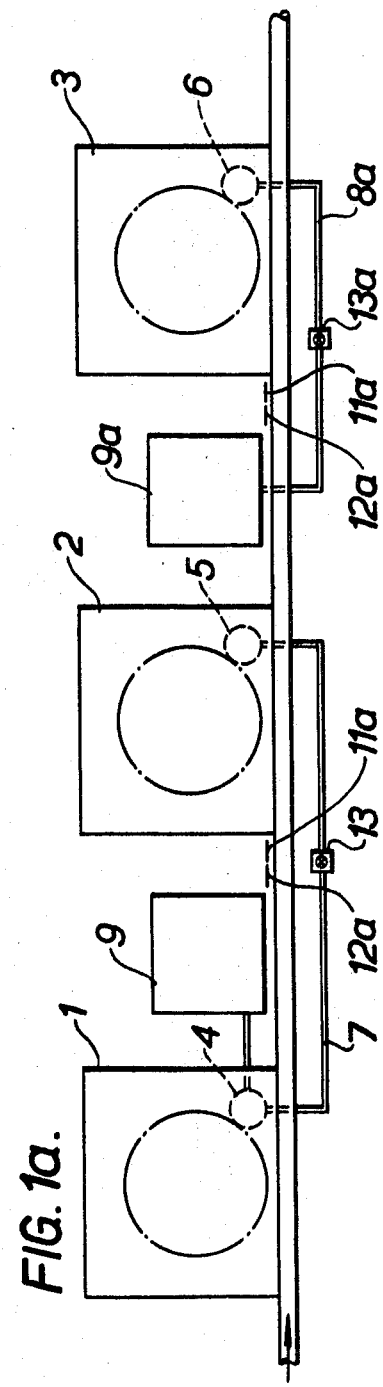

INVENTOR
VICTOR IAN MALCOLM COX

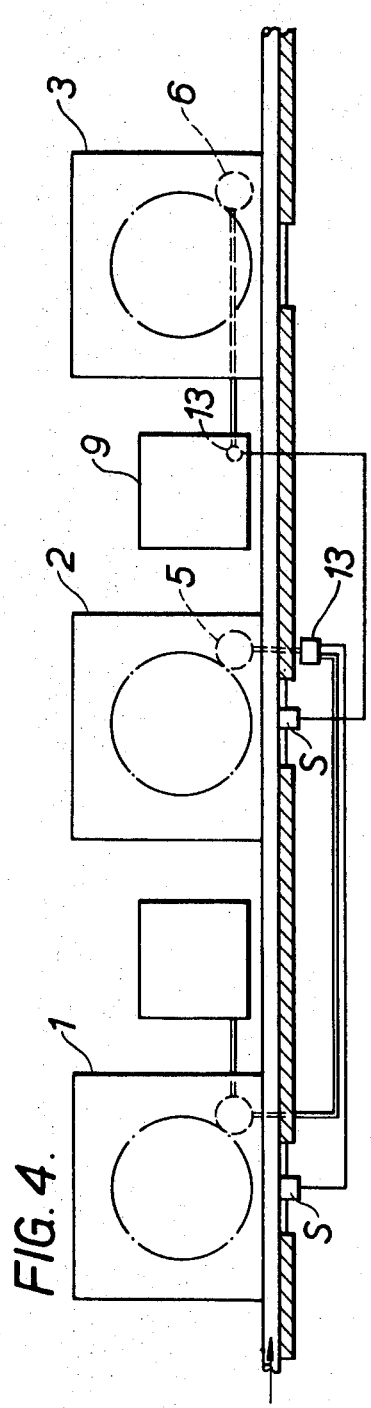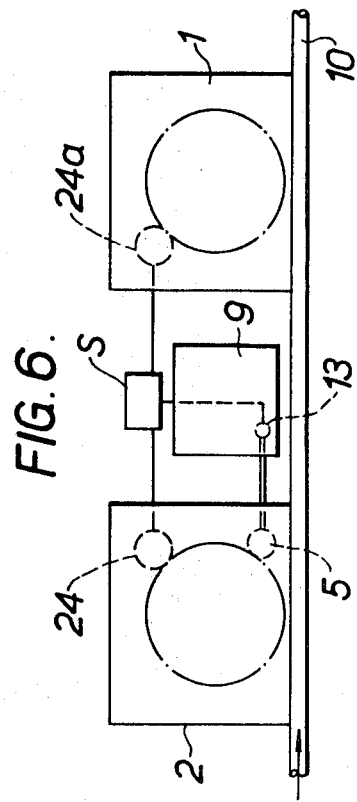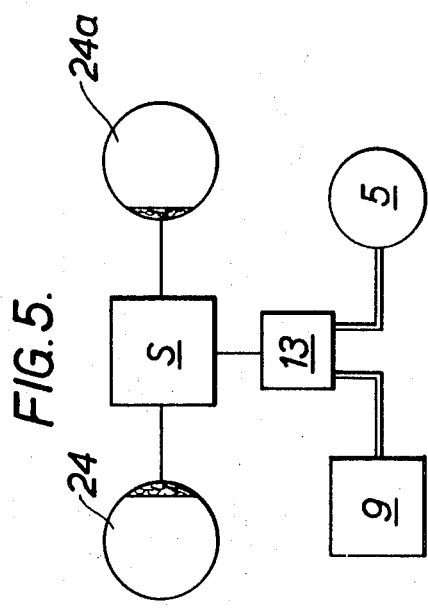

SYSTEM OF DRIVING A PLURALITY OF MACHINES

The present invention relates to a system of driving a plurality of machines, and especially machines which perform sequential operations on each article of a travelling series of articles passing through the successive machines. A typical example is the case of different machines used in bottling and like operations, such as sequentially arranged filling, capping and labelling machines.

In modern methods of mass production it is frequently important to maintain such an ordered flow of the articles through the successive machines of the system as to ensure continuity of operation with the minimum of manual control.

The present invention aims to use one machine as a master machine driven hydraulically or by any suitable source of power and one or more machines as slave machines driven in synchronism with the master machine and either at the same speed, or at a speed to give the same output, as the master machine.

It is extremely difficult if not impossible to ensure that the machines of a system as aforesaid will each maintain a predetermined speed and such a variation in the relationship between the speeds of the respective machines may occur as would interfere with the ordered operation of the system and may lead to damage of one or other of the machines in the system and/or of the articles.

The present invention provides a system of synchronizing a plurality of machines comprising means for sensing when the machines are running out of synchronism and means operative in response thereto for controlling the drive of at least one of the machines to restore synchronism.

The invention includes a system for driving the machines from one or more hydraulic power units through hydraulic motors under the control of means responsive to a change in a predetermined speed relationship of the machines substantially to restore that relationship.

A master machine, which may be but is not necessarily the first in a sequence, and one or more slave machines may each be provided with a hydraulic motor supplied by either a common power unit or by separate power units. Each power unit may be a pumping unit.

For example, the first or master machine may be a filling machine; a first slave machine a capping machine and a second slave machine a labelling machine, but any one of these machines may be the master machine i.e., the machine with which slave machines are to synchronize.

In one embodiment, containers, e.g., bottles, may be fed as a series one behind the other through the successive machines by way of a continuous free conveyor driven hydraulically under the control of a power unit, e.g., by the pump of the master machine and relying on the synchronized speed of the machines to maintain a desired head of articles to each machine. In other cases the articles may be controlled in conveyance by worm feed shafts.

In certain systems according to the invention, synchronization is achieved by sensing means responsive to changes in the relative speeds between a monitoring component of one machine and such a component of another machine, e.g., components driven in rotation off the drive of the machines at the machine speed or in a suitable ratio thereto and serving as monitoring components to vary the sensing means only when there is a change in the relative speeds of said components arising from a lack of synchronization of the machines, the valve means controlling the flow of hydraulic medium responding to the sensing means and rectifying the relative machine speed. The monitoring components could be stationary until lack of synchronization occurs.

According to another form of system according to the invention, the sensing means may respond to the lack of a predetermined flow of the articles and be under the control of the articles themselves. For example, the sensing means may respond only when a predetermined 'head' of articles, a given number in the desired close order, is not entering each slave machine, i.e., when gapping or crowding of articles forming the head exhibits itself due to the lack of synchronization of the machines.

In this latter case, a mechanical sensing member may be employed, e.g., in the form of a hinged gate, flap or arm, which, whenever a gap or enlarged gap is created in the said head of articles to a machine may move in the path of the articles and through appropriate means e.g., electrical, mechanical or pneumatic, cause the operation of the flow valve means in the hydraulic system. The desired effect may however be achieved by various other forms of sensing means, e.g., a light beam or compressed air jet control responsive to the absence or position of an article to control the hydraulic flow valve means aforesaid. Such a gap or space variation may be caused if the speed of the appertaining slave machine becomes too fast or the speed of the preceding machine is too slow and the effect of the control in the hydraulic system will be to tend to synchronize the machines and restore the normal flow.

A further sensing means may be provided which is normally inoperative but comes into operation if a condition of crowding of the articles occurs. This may happen for example if a machine receiving a head of articles becomes too slow or the preceding machine becomes too fast in its operating speed. If, as a result of such crowding, an article, in those fed to that machine, suffers lateral displacement from the normal line of flow, that article may be sensed mechanically, e.g., by a hinged or sliding gate, flap or arm or by its influencing a light beam or air jet control or other suitable means and initiate the control of the hydraulic flow valve means.

Two such sensing members may be provided in association with each machine or each slave machine. A common device could be used which senses both gapping and crowding.

Where monitoring components are used as aforesaid the said components may be members rotated off the driving motors or other suitable driven parts of the machines with the component of one machine matching that on another machine, but so that sufficient change in the relative speeds will cause the operation of a sensing device which initiates an appropriate adjustment of the hydraulic flow valve means and tends to restore the matching condition. There are various ways in which such rotating components may control a sensing device, e.g., the components may be discs apertured or marginally recessed to shut off or permit, the flow of a fluid such as air to fluid-responsive sensing means during each revolution, and to permit fluid flows controlled by the components of different machines to actuate the sensing means and initiate rectification when the fluid flows vary in consequence of a change in the relative speeds of the machines and therefore the components. Alternatively similar rotary components could be arranged to effect the control of a sensing means by electrical means e.g., by electrical impulses timed by the magnetic operation of suitable contacts.

There may be more than one slave machine each with its own hydraulic motor and sensing member, or with common sensors between machines.

When synchronization is reestablished a basic condition of the hydraulic system, which may be a moderately fluctuating condition, will be restored.

In the case of certain articles and/or with high-speed systems it may be desirable to provide positive control of the articles on the conveyor and this can be achieved by screw or wormshafts driven by the machines and arranged in alignment or by chains with spacing lugs or the like, or by other suitable means.

In this case a sensing means responsive to variation of the relative sped of the shafts may actuate the flow valve and tend to restore synchronism by controlling the speed of the motors driving them.

Various forms of sensor, e.g., pneumatic can be used for this purpose, but we have devised a mechanical sensor which is well suited for the purpose.

One simple form of mechanical sensor for this purpose operates in that a screw shaft feeding one machine is coupled with the adjacent screw shaft feeding the next machine by a coupling which in response to a variation in the relative speeds of the two shafts creates a relative axial movement between the coupling members. The coupling may be a pin and helical slot coupling, a suitable nut and screw coupling, or a worm coupling or other suitable coupling which is responsive as aforesaid to result in the direct operation of the valve means to vary the flow of hydraulic fluid which controls synchronization or result in operation of a pneumatic valve which controls the hydraulic valve means.

One end of one screw shaft may be formed with a helical slot or groove in a bush carried by an integral axial stub end of the shaft and forming one element of the coupling and the adjacent end of the next screw shaft may be end socketed to accommodate the bush and provided with a pin or pins to engage the slot or groove and form the other element of the coupling rotatable with that shaft but free for axial movement relative thereto in response to varying relative speed of rotation of the two shafts. The socket may carry a finger or other suitable means for actuating a valve controlling flow of fluid through that motor which has to be rectified as to its speed. This actuation could be by remote control, e.g., through a Bowden mechanism.

A mechanical sensor may be used between other components than the shafts aforesaid and operate on the principle of converting relative rotary movement to a rectilinear or axial operating movement.

In order that the invention may be the more clearly understood, reference is hereinafter made to the accompanying drawings, in which FIG. 1 is a diagrammatic view of an arrangement to couple hydraulic machines driven from one power unit and speed controlled by articles passing freely along a conveyor. FIG. 1a is a generally similar diagrammatic view but where the machines are driven from more than one power unit.

FIG. 4 is a view of an arrangement similar to FIG. 2 but where separate power units are installed.

FIG. 5 depicts diagrammatically an arrangement where the sensing device controlling the hydraulic flow valve is responsive to monitoring devices which are in turn rotated by the machines.

FIG. 6 shows diagrammatically an arrangement according to FIG. 5 arranged for synchronizing the speeds of independently driven machines.

Figure 2:
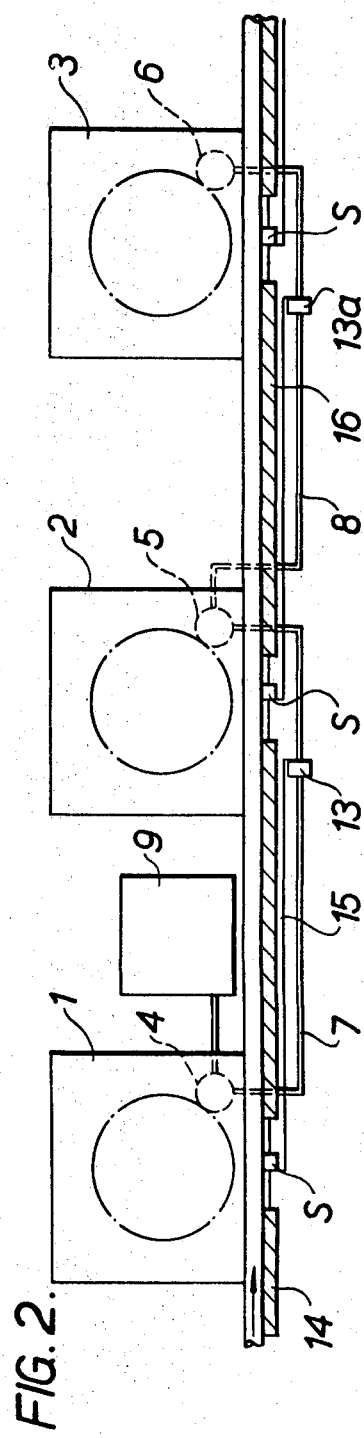
FIG. 2 illustrates diagrammatically an arrangement where there is positive control of the articles and a different control for synchronization, and where screw feed shafts for the articles are present.

In the diagram, FIG. 1, three machines 1, 2 and 3 are indicated e.g., a master machine 1 which in this instance is the first machine of the series and is a bottle-filling machine, a first slave machine 2, in this instance a bottle-capping machine and 3, in this instance, a bottle-labelling machine. It is the aim to synchronize the slave machines with the master machine.

The machines are driven by hydraulic motors 4, 5 and 6, in this case series connected by fluid lines 7 and 8 and powered by a single power unit, e.g., a suitable pumping unit 9.

A conveyor 10 serves (or conveyors serve) to convey the bottles through the system, from one machine to the next. The conveyor is driven for example from the power unit to be in synchronism with the master machine, although some control for manual trimming of the speed of the conveyor is desirable. The conveyor can be one which freely conveys the articles, as distinguished from the screw control later herein described.

Each machine is associated with two sensing members indicated at 11 and 12.

The sensing member 11 may be a gate or arm e.g., spring loaded and normally tending to hinge into the path of the bottles on the conveyor. Each sensor 11 controls flow of hydraulic fluid to the machine it is associated with. It can be positioned appropriately for this purpose. The bottles actuate the gate or arm sensor and so long as a predetermined head of bottles enter the machine the sensor will be maintained thereby in a position to permit a predetermined flow of hydraulic fluid past a flow control valve 13 in the hydraulic fluid line to that machine.

If however a gap occurs in the head of bottles entering that machine, for example, because one machine, say the first slave machine 2, is running too fast, the sensor will move into the line of flow and through suitable means as aforesaid will control the relevant flow valve 13 in the line 7 and the operation of the relevant hydraulic motor of that machine and cause a reduction in the speed of the said machine and/or a speeding up of the preceding machine.

The further sensor member 12, (e.g., spring loaded) is responsive to crowding of the bottles in the head entering a machine resulting from that machine, say machine 2, running too slowly or the preceding machine running too fast. For example a bottle will be displaced laterally and operate the sensor 12 controlling that machine. The sensor, through appropriate means as aforesaid, will control the valve 13 (or a separate hydraulic valve) and thus the hydraulic motor of that machine to cause a speeding up of the machine to relive the crowding and/or a slowing down of the preceding machine.

In either case the tendency is to reestablish synchronism.

Too fast or too slow a feed from the first slave machine will affect the second slave machine but in the same way the sensors 11a and 12a associated with that machine will function like the sensors 11 and 12 of the first slave machines to tend to reestablish synchronism, the sensors 11a, 12a, controlling valve 13a in the line 8.

There may be further machines in the system and each further machine may be similarly provided with sensors such as have been hereinbefore described.

FIG. 1a illustrates a variant in which a separate power unit 9a supplying a line 8a is provided for the second slave machine, the parts corresponding to those in FIG. 1 being identified by the same reference numerals. A separate power unit may be provided for any subsequent slave machine that may be present.

The diagram, FIG. 2 indicates an embodiment in which the articles, e.g., bottles, are fed to and from the respective machines a conveyor and under the control of screw or wormshafts. The master machine 1 is fed by the wormshaft 14 driven by that machine. A wormshaft 15 feeds from the master machine to the first slave machine 2 and is driven by the latter machine.

A similar wormshaft 16 feeds the second slave machine 3 from the first machine. The wormshaft 16 is driven by the second slave machine. A power unit 9 feeds the hydraulic motors 4, 5, 6 which are in series in the fluid lines 7 and 8. The machines are designed to operate in synchronism, i.e., timed to ensure a regular flow of bottles.

Figure 3:
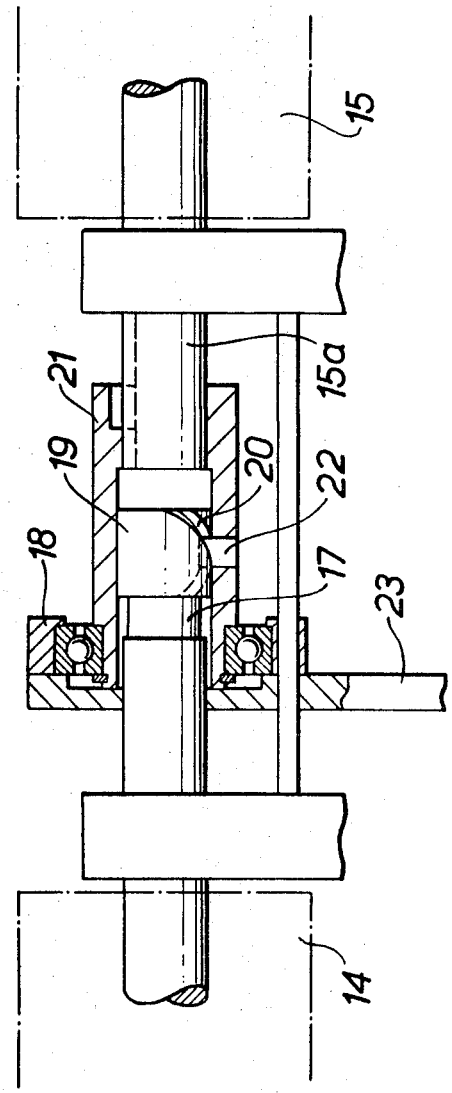
FIG. 3 is a view of a mechanical sensing device which is applicable to an arrangement according to FIG. 2.

In order to compensate for any lack of synchronism, the wormshaft 14 of the master machine is coupled to the wormshaft 15 by a coupling as shown in FIG. 3 which acts as a mechanical sensor. A similar coupling is arranged between the shaft 15 and the shaft 16 driven by the second slave machine 3. Describing the coupling between shafts 14 and 15 for example, the shaft 14 is formed with an integral stub shaft 17 an shaft 15 is formed with a stub shaft 15a. The stub shaft 17 is supported in a bearing 18 and carries a bush 19 having a helical slot or groove 20. The adjacent end of the stub shaft 15a is keyed to a socket 21 having an internal pin 22 engaging the helical slot or groove 20 so that the socket is constrained to rotate with the shaft 15 but is free to move axially thereof. The beaing is provided with a finger 23 which is connected to a spool for operating the hydraulic flow valve 13 (FIG. 2). The coupling is there indicated diagrammatically since the sensing means could be a pneumatic or other sensor if the shafts be uncoupled and could be responsive to rotating components driven b the machines as is hereinafter described in relation to FIG. 5. The sensor is therefore indicated diagrammatically by S in FIG. 2. Where the parts in FIG. 2 correspond to those in FIG. 1 they have been given the same reference numerals.

Now should the speed of one machine vary from the predetermined speed there will be a consequent relative rotation between the two shafts and threfore, the socket 21 and the bearing 18 will be displaced axially, carrying with them the finger 23 and causing the operation of the valve 13 associated with the slave machine 2. The direction in which the socket moves axially axially however upon how the relative speeds vary, i.e., whether the shaft 14 runs faster than the shaft 15 or vice versa and the hydraulic flow valve will be adjusted accordingly. Such a coupling is interposed between each adjacent pair of shafts (machines) save the last pair of shafts (machines). The wormshafts of each machine are driven by the hydraulic motor driving that machine.

Should, for example, the speed of the first slave machine become faster than the predetermined speed, there will be relative displacement between the socket and shaft to cause the flow valve 13 associated with the hydraulic motor of that machine to be controlled to reduce the flow of hydraulic fluid to that motor or, alternatively, should the speed of the said machine become reduced, the socket will be displaced axially in the reverse direction and operate the valve device to increase the fluid flow and speed up the motor.

The same will apply to the second or any subsequent machine where the shafts are coupled as aforesaid, and the tendency is to restore the original synchronism of the machines whenever this is disturbed.

The arrangement shown in FIG. 4 is similar to that shown in FIG. 2 and similar reference numerals are used to indicate the like parts of FIG. 2. However in this arrangement a separate power unit 9f is provided for operating the hydraulic motor 6 of the second slave machine 3. This figure also shows that where the second machine is the last in the series the conveyors feeding and delivering from that machine may be rigidly interconnected or formed as one. A further alternative illustrated in this figure is the provision of the flow valve 13 in the delivery outlet of the pump of the power unit 9f.

FIG. 5 shows an arrangement where the hydraulic flow valve 13 through the sensing device S controlling it is responsive to monitoring elements 24, 24a rotated by the machines and at the speed of the respective machines or in a given ratio thereto. The monitoring element 24 is driven by say the master machine and the monitoring element 24a by the slave machine, a similar arrangement being provided between slave machines when two or more are present. In the diagram the hydraulic power unit 9 is indicated and 5 indicates the hydraulic motor driving the slave machine.

FIG. 6 illustrates a system based on FIG. 5 and also depicts a system in which the master machine 1 can be driven by any suitable source of power, either by a hydraulic motor or otherwise.

The rotary monitoring components 24, 24a are here illustrated as are the common sensing means S. Power unit 9 is shown connected to hydraulic motor 5 which drives the slave machine 2, which may be the first of a plurality. The conveyor is indicated at 10, and may be such as to convey the articles freely or be associated with screw or wormshafts as previously described.

The hydraulic flow valve 13 is shown in this embodiment arranged as it may be arranged in other of the embodiments described, in the discharge side of the power unit.

Figure 7:
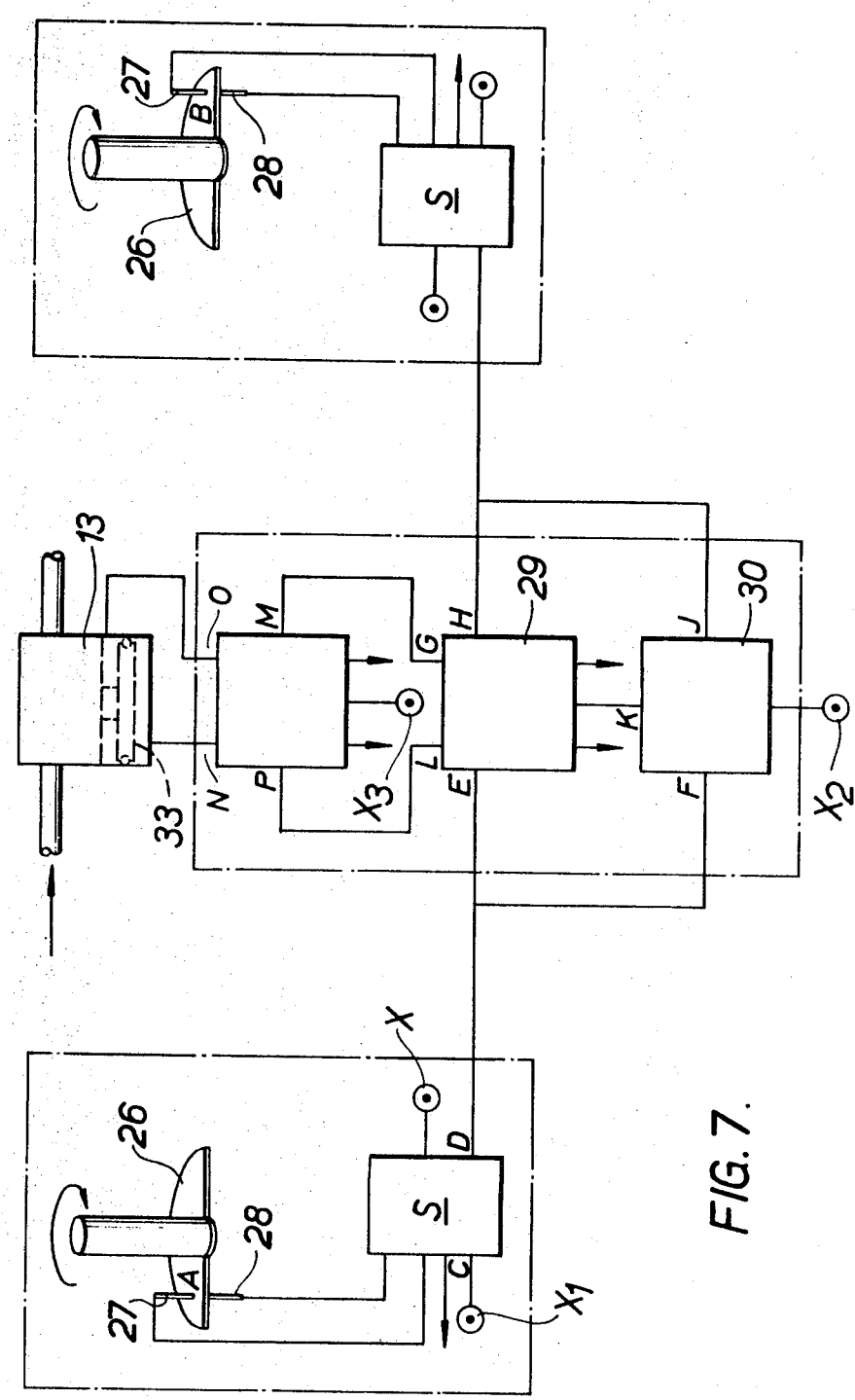
FIG. 7 is a diagrammatically lay out of circuitry suitable for performing the basic idea depicted in FIG. 5.

It will be appreciated that many ways are available for fulfilling the basic conception described and illustrated with reference to FIGS. 5 and 6, and by way of example a layout is illustrated in FIG. 7. In this layout, the monitoring components are in the form of part or half discs 26 which are arranged to be driven off the drive of the machine or some part driven thereby, so as to rotate at or in given ratio to the speed of the machine. The discs are arranged to rotate at the same speed when the machine speeds are synchronized.

A sensing valve S is associated with each disc and the valve communicates with two opposed tubes 27, 28 so that airflow from the source bridging the tubes is cut off by the disc save when the cutout segment thereof is in register with the opposing ends of the tubes.

At synchronous speeds identically phased impulses are transmitted and reactions to these impulses are self-cancelling within the pneumatic circuit elements.

When lack of synchronization occurs the impulses are varied and it is the response of the sensor to the effect of the unsynchronous impulses acting thereon in response to the actuation of the monitoring components of the related machines, and the control of the hydraulic valve in response to the sensor actuation that is the essence of the arrangement, since many ways can be envisaged of putting this into effect.

The description which follows is one example.

The first unsynchronous impulse, say when the sensing gap is at A, causes the pneumatic sensing valve S associated therewith to operate by compressed air from supply point X of the main supply, connecting a mains air source to flow from supply point XI by way of connections C and D to the connections E and F respectively of a flip-flop device 29 and an AND-device 30.

Mains pressure at connection E causes the connection G of the flip-flop device 29 to open, although at this stage the AND device prevents flow through the connection G.

The second unsynchronous impulse will come from the more slowly rotating or retarded machine initiated at the gap at B of the monitoring disc at that machine, and it will act on the circuit as did the first impulses at A by directing equal mains air pressure to the connection H of the flip-flop device 29 and the connection J of the AND-device 30.

Inasmuch as the pressures at the connections E and H will be equal, flip-flop switching will not occur and the otput connection G will remain open.

When equal pressures are established at the connections F and J of the AND device, mains pressure can flow from supply point $X^2$ through connection K and through the flip-flop element 29 and connection G.

While airflow continues through connection G no flow will take place through a connection L of the flip-flop device 29.

Airflow from the flip-flop device controls a second flip-flop device 32 to which mains air can be delivered from the supply point $X^3$. Airflow from connection G to a connection M of the flip-flop 32 permits flow through output connection N of the device 32 to one side of a piston 33 which operates flow control valve 13 through which hydraulic medium passes to power the slave machine. The direction of piston movement resulting from this sequence of operations is such that synchronization is restored and followed by out-of-phasing in the opposite sense to that just rectified.

When this happens the first flip-flop 29 switches to open the connection L. This is followed by the pressures at the connections F and J permitting mains airflow to take place by way of the connection K through connection L of the flip-flop 29 to a connection P of the second flip-flop 32. This latter flip-flop is switched in to permit flow from connection L to a connection 0 of the flip-flop 32 and mains air will be directed from the supply point $X^3$ to the opposite end of the piston controlling the hydraulic valve.

The arrows indicate exhaust.

Hence the arrangement is such that continuous 'hunting' occurs within very narrow limits determined largely by the speed of response of the pneumatic elements.

The pneumatic sensing valves S may be those produced as Pneumaid supersensitve type by Hamilton Controllers Ltd. of Uxbridge, England.

The pneumatic circuitry described with respect to and illustrated in FIG. 7 could without much modification in the general layout be adapted for electrical instead of pneumatic operation.

For example, in place of the rotating discs rotating annular components each with a magnet-carrying spoke could be provided to produce input signals by intermittently, e.g., at each rotation, magnetically making or breaking the contacts of reed switches mounted instead of the air jet tubes aforesaid.

The speed-sensing device could in this case consist of solid-state switching constructed to respond through memory means to the signal of say the faster or fastest running machine. The hydraulic flow valve could then be solenoid operated.

It is also possible to modify the actuation of the flow valve by the mechanical sensing coupling hereinbefore described in relation to FIG. 3. The relative axial movement between the coupling elements resulting from one machine operating faster than another could be used to close an orifice and permit air pressure to be built up in a pneumatic circuit. This pressure could act, e.g., through a suitable valve, upon a small reservoir of hydraulic medium to cause the piston of a hydraulic flow control valve connected to the reservoir to operate the valve for regulating the flow of hydraulic power medium to the slave machine.

What is claimed is:

1. A system of synchronizing a plurality of machines, comprising means for conveying articles successively through the machines, means for sensing when the machines are running out of synchronism and valve means operative in response thereto for controlling the flow of hydraulic medium to which the drive of at least one of the machines responds to restore synchronism.

2. A system according to claim 1, in which the sensing means are controlled by the travelling articles.

3. A system comprising:
a plurality of machines,
means associated therewith for conveying articles successively through the machines,
shafts driven by the machines,
means mechanically coupling said shafts, and
means actuable thereby in response to the machines running out of synchronism and a relative speed or change of relative speed occurring between the coupled shafts to restore synchronism.

4. A system according to claim 3 comprising aligned screw or wormshafts for controlling the conveyance of the articles.

5. A system according to claim 4, in which the sensing means are responsive to a relative speed or change of relative speed occurring between the shafts.

6. A system according to claim 5, in which separate screw or wormshafts controlling the conveyance of the articles are coupled by means of members which are relatively axially displaceable in response to a relative speed or change in relative speed occurring between the coupled shafts to operate or initiate the operation of the flow valve means for restoring synchronism.

7. A system according to claim 6, in which one member of the coupling carried by one shaft is axially displaceable but nonrotatable relative thereto and the other member of the coupling is carried by the other shaft, the said members having cooperative pin and helical slot or groove engagement for producing the relative axial movement in response to relative rotation of the shafts.